(12) United States Patent
Reches et al.

(10) Patent No.: US 9,391,904 B2
(45) Date of Patent: Jul. 12, 2016

(54) DELAY TIMER DEVICE, METHOD FOR MANAGING A PLURALITY OF DELAYS, AND APPARATUS FOR DELAYING A PLURALITY OF DATA PACKETS

(71) Applicant: Huawei Technologies Co., Ltd., Shenzhen (CN)

(72) Inventors: Shlomo Reches, Munich (DE); Nissim Dangur, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 14/290,712

(22) Filed: May 29, 2014

(65) Prior Publication Data

US 2014/0269286 A1    Sep. 18, 2014

Related U.S. Application Data

(63) Continuation of application No. PCT/EP2011/071303, filed on Nov. 29, 2011.

(51) Int. Cl.
*H04L 12/815* (2013.01)
*H04L 12/875* (2013.01)
*H04L 12/841* (2013.01)
*H04L 12/823* (2013.01)

(52) U.S. Cl.
CPC ............... *H04L 47/22* (2013.01); *H04L 47/28* (2013.01); *H04L 47/32* (2013.01); *H04L 47/564* (2013.01)

(58) Field of Classification Search
None
See application file for complete search history.

(56) References Cited

U.S. PATENT DOCUMENTS

| | | | |
|---|---|---|---|
| 6,977,942 B2 * | 12/2005 | Raisanen | H04L 12/5693 370/235 |
| 2005/0156647 A1 * | 7/2005 | Kim | G11C 7/22 327/276 |
| 2009/0220238 A1 | 9/2009 | Wang et al. | |

FOREIGN PATENT DOCUMENTS

| | | |
|---|---|---|
| CN | 101212389 A | 7/2008 |
| EP | 1113645 A2 | 7/2001 |
| WO | 03001353 A2 | 1/2003 |

OTHER PUBLICATIONS

Sarakis, et al. "A Versatile Timing Unit for Traffic Shaping, Policing and Charging in Packet-Switched Networks," Journal of Systems Architecture, 54, Jan. 2008, pp. 491-506.
Varghese, et al. "Hashed and Hierarchical Timing Wheels: Efficient Data Structures for Implementing a Timer Facility," IEEE/ACM Transactions on Networking, vol. 5, No. 6, Dec. 1997, 11 pages.
International Search Report received in Application No. PCT/EP2011/071303, mailed Feb. 3, 2012, 15 pages.

* cited by examiner

*Primary Examiner* — Kevin C Harper
(74) *Attorney, Agent, or Firm* — Slater Matsil, LLP

(57) ABSTRACT

An embodiment delay timer for timing a plurality of delays includes a delay clock comprising a number of clock memories, wherein the number of clock memories corresponds to a number of digit positions of a delay clock value, and a delay memory configured to store the plurality of delays. The delay timer further includes a delay logic unit configured to add a new delay by storing it in the delay memory and to time the new delay by coupling it to that clock memory which corresponds to the most significant digit position of the delay value of the new delay that is not zero, by subsequently coupling the new delay to that clock memory which corresponds to the next less significant digit position of the delay value according to the delay value of the new delay and by generating a delay signal when the new delay expires.

17 Claims, 4 Drawing Sheets

DELAY TIMER DEVICE, METHOD FOR MANAGING A PLURALITY OF DELAYS, AND APPARATUS FOR DELAYING A PLURALITY OF DATA PACKETS This application is a continuation of International Application No. PCT/EP2011/071303, filed on Nov. 29, 2011, which is hereby incorporated by reference in its entirety.

TECHNICAL FIELD

The invention relates generally to clocks or timers in electronic devices, especially for data networks, and more particularly to a delay timer for timing a plurality of delays, a method for managing a plurality of delays, and an apparatus for delaying a plurality of data packets.

BACKGROUND

In modern electronic devices clocks or timers are used to accomplish various tasks. In modern data networks for example clocks or timers are needed for data shaping. Data shaping is required to smooth traffic burstiness to control and limit data packet queues at the receiving units and to enforce contract between service providers and clients.

In traffic shaping applications the incoming traffic is measured, and upon exceeding a certain limit defined for the data traffic, the incoming traffic is detained or delayed to maintain a stable data rate with minimum burstiness. Such a traffic shaper manages the delays of the data packets using timers for timing the delay of each single data packet or for timing delays in a data packet flow queue. When a timer signals that a delay has expired, the corresponding traffic is transmitted from the queue of delayed packets.

Traffic shapers for very high bandwidth applications delay millions of data packets or flow queues at any given time.

Managing a low number of delays can be realised using hardware timers for all the delayed packets or flow queues. But for millions of delays the number of counters, and thus the amount of integrated circuitry, like for example flip flops, would increase dramatically. This would increase the energy consumption and the cost of the device to levels which render such a traffic shaper uneconomical.

Therefore, for a large number of delays methods of timing those delays have been developed, that include a processor and data memory for storing the delays. In such a traffic shaper a delay value is stored in a memory, and that delay value is constantly decremented until it reaches zero. If a delay value reaches zero, that delay expires and the data packet is transmitted or the flow queue is allowed to send traffic. In such a traffic shaper for every decrement of a delay value, a read and write access to the memory is necessary, followed by a compare to zero operation. If the range for the delay values is 0 to 1000, in a worst case scenario there would be 1000 read and write accesses to memory per each delay. This would cause performance bottlenecks when used with a great number of data packets or flow queues.

Consequently methods have been developed to reduce the amount of computation necessary for managing delays. One method comprises counting the single digits of a delay value with their corresponding rate. For example a delay of 987 would be counted as 9 hundreds-steps, 8 tens-steps and 7 ones-steps. Thus the amount of computation needed is reduced to the sum of the digits of the delay value. But depending on the amount of timers and the delay value range with millions of delays, the processing could still amount to such extent high value that performance issues could arise.

SUMMARY

An object of the present invention is to provide means for efficiently managing delays of a plurality of data packets.

The above referenced object of the invention is achieved, in accordance with a first aspect of the present invention, by a delay timer device for timing a plurality of delays, comprising a delay clock comprising a number of clock memories, wherein the number of clock memories corresponds to the number of digit positions of the delay clock value. The delay timer device comprises a delay memory configured to store the plurality of delays. The delay timer device also comprises a delay logic unit configured to add a new delay by storing it in the delay memory and to time the new delay by coupling it to that clock memory which corresponds to the most significant digit position of the delay value of the new delay that is not zero, by subsequently coupling the new delay to that clock memory which corresponds to the next less significant digit position of the delay value according to the delay value of the new delay and by generating a delay signal when the delay expires. The present invention provides a delay timer that is capable of timing a delay with very little computational effort. In order to time a delay the delay timer has to operate on that single delay in a worst case only once for every digit of the delay value. If for example the delay would end in one exemplary embodiment with a delay clock value having a ones digit of zero, e.g., 220, the delay timer would only have to operate on the delay for the hundreds and the tens. Thus, the delay timer could time the delay by operating on the delay only twice. Furthermore, the present invention allows providing a delay timer that can easily be adapted to different delay clock value specifications by simply adding or removing clock memories if needed.

In a first possible implementation of the delay timer device according to the first aspect of the invention each clock memory comprises at least one memory block for every digit in a number system used by the delay timer device and the delay clock comprises one pointer for every clock memory. The pointer is configured to point to the memory block indicating the actual delay clock value at the digit position which refers to the respective clock memory. By using pointers to indicate the actual delay clock value in respective optimized implementations the delay clock value can easily be computed by adding the values of the single pointers without the need for complex computations. Furthermore, a delay timer according to the present invention allows use of any number system that is appropriate for a certain execution environment. In optimized implementations, if the delay timer uses the decimal number system at least ten memory blocks must be provided in the clock memories. Consequently, if the delay timer uses a hexadecimal number system, in optimized implementations at least sixteen memory blocks must be provided in the clock memories. For an octal number system, in optimized implementations at least eight memory blocks must be provided in the clock memories.

In a second possible implementation of the first possible implementation of the delay timer device according to the first aspect of the invention a basic time interval for the delay timer indicates the time step corresponding to a one digit increment of the least significant digit position of the delay clock and the delay clock comprises a clock logic unit, wherein the clock logic unit is configured to increment the pointer which refers to the least significant digit position of the delay clock after every basic time interval. The clock logic unit is further configured to reset each pointer to point to the memory block which refers to the lowest digit of the number system when the pointer is incremented while pointing at the memory block which refers to the highest digit of the number system and wherein the clock logic unit is further configured to increment at the same time the pointer which refers to the next more significant digit position to point to the next memory block. This enables providing a delay clock that can be managed with very little computational effort. The actual delay clock value can be updated by simple "+1" operations on the pointers and a simple "if" clause enables checking whether the pointer needs to be reset. No complex arithmetic is needed.

In a third possible implementation of the first or second implementation of the delay timer device according to the first aspect of the invention the delay logic unit is further configured to add a new delay by coupling the stored new delay to the clock memory that refers to the most significant digit position of the delay value of the stored new delay, that is not zero. The stored new delay is associated to the memory block of the clock memory that is the memory block at the position at which the respective pointer points at the time of adding the new stored delay incremented by the number of steps indicated by the most significant digit position of the delay value of the stored new delay that is not zero plus the carryover of the sum of the digits of the less significant digit positions of the delay value of the stored new delay and the digits of the less significant digit positions of the actual delay clock value. By associating a new delay to a memory block of a corresponding clock memory providing a very effective way of supervising a delay is enabled. To identify if the delay has to be processed again at a specific delay clock cycle it is not necessary to compare all delays to the actual delay clock value. It is sufficient to only process those delays, which are associated to the memory block of the clock memory which the pointer of the clock memory is actually pointing at.

In a fourth possible implementation of the first, second or third implementation of the delay timer device according to the first aspect of the invention the delay logic unit is configured to couple a delay to the clock memory which refers to the next less significant bit of the delay value when the pointer which refers to the clock memory to which the delay is momentarily associated to reaches the memory block of the clock memory to which the delay is associated to. The delay logic unit is further configured to couple the delay to a memory block of the clock memory which refers to the next less significant bit of the delay value, the memory block referring to the memory block at which the respective pointer points at the time of coupling the delay incremented by the number of steps indicated by the next less significant digit position of the delay value of the delay, plus the carryover of the sum of the digits of the digit positions of the delay value of the delay less significant than the next less significant digit position and the digits of the less significant digit positions of the actual delay clock value less significant than the next less significant digit position. This enables providing very effective means of processing a delay when a pointer of a clock memory points at the memory block a delay is coupled to.

In a fifth possible implementation of one of the first to fourth implementations of the delay timer device according to the first aspect of the invention the delay logic unit is configured to indicate the expiration of a delay when the pointer which refers to the least significant bit position of the delay clock reaches the memory block to which the respective delay is associated.

In a sixth possible implementation of one of the second to sixth implementations of the delay timer device according to the first aspect of the invention each clock memory comprises one additional memory block, wherein the additional memory block is positioned after the memory block which refers to the highest digit of the number system. The clock logic unit is further configured to reset each pointer to point to the memory block which refers to the lowest digit of the number system when the pointer is incremented while pointing at the additional memory block and wherein the clock logic unit is further configured to increment at the same time the pointer which refers to the next more significant digit position to point to the next memory block. The delay logic unit is configured to compensate for system clock intervals being shorter than the basic time interval of the delay clock using the additional memory block when coupling a delay to a memory block. This enables providing means to compensate for a basic time interval that lasts longer than one clock cycle of an integrated circuit the delay timer is embedded in.

In a seventh possible implementation of one of the first sixth implementations of the delay timer device according to the first aspect of the invention the delays which are associated to one memory block are organized in a linked list, the memory block comprises a pointer to the first element of the linked list and/or a pointer to the last element of the linked list and a delay comprises a delay time value and/or a delay time remainder and a delay pointer to the next delay in the linked list. Linked lists enable managing a list of objects, in this case delays, very effectively and removing and adding delays to the linked list very effectively.

In an eighth possible implementation of one of the first to seventh implementations of the delay timer device according to the first aspect of the invention the delay timer device comprises a programmable logic device and/or a processor and/or an application specific integrated circuit and/or a computer program product. Providing the delay timer in different electronic apparatuses enables adapting the delay timer to a variety of different use cases.

The above mentioned goal of the present invention is also achieved according to a second aspect of the present invention by a method for timing a plurality of delays, comprising the steps of providing a delay timer device according to the first aspect of the invention or to any one the first to eighth implementations of the delay timer device according to the first aspect of the invention; storing the a delay in a delay memory; coupling the new delay to a clock memory which refers to the most significant digit position of the delay value of the new delay that is not zero; subsequently coupling the new delay to that clock memory which corresponds to the next less significant digit position of the delay value according to the delay value of the new delay; and generating a delay signal when the delay expires.

In a first implementation of the method for timing a plurality of delays according to the second aspect of the present invention the method comprises the steps of providing at least one memory block for every digit in a number system used by the delay timer device in the clock memory; providing one pointer for every clock memory; and pointing the pointer to the memory block indicating the actual delay clock value at the digit position which refers to the respective clock memory.

In a second implementation of the first implementation of the method for timing a plurality of delays according to the second aspect of the present invention a basic time interval for the delay timer indicates the time step corresponding to a one digit increment of the least significant digit position of the delay clock. The method comprises the steps of incrementing the pointer which refers to the least significant digit position of the delay clock after every basic time interval; and resetting each pointer to point to the memory block which refers to the lowest digit of the number system when the pointer is incremented while pointing at the memory block which refers to the highest digit of the number system and further incrementing at the same time the pointer which refers to the next more significant digit position to point to the next memory block.

In a third implementation of the first or second implementation of the method for timing a plurality of delays according to the second aspect of the present invention a new delay is added by coupling the stored new delay to the clock memory that refers to the most significant digit position of the delay value of the stored new delay that is not zero and coupling the stored new delay to the memory block of the clock memory that is the memory block at the position at which the respective pointer points at the time of adding the new stored delay incremented by the number of steps indicated by the most significant digit position of the delay value of the stored new delay that is not zero plus the carryover of the sum of the digits of the less significant digit positions of the delay value of the stored new delay and the digits of the less significant digit positions of the actual delay clock value.

In a fourth implementation of the first, second or third implementation of the method for timing a plurality of delays according to the second aspect of the present invention a delay is associated to the clock memory which refers to the next less significant digit position of the delay value when the pointer which refers to the clock memory to which the delay is momentarily associated to reaches the memory block of the clock memory to which the delay is associated to. The delay is associated to a memory block of the clock memory referring to the next less significant bit of the delay value, the memory block which refers to the memory block at which the respective pointer points at the time of coupling the delay incremented by the number of steps indicated by the next less significant digit position of the delay value of the delay, plus the carryover of the sum of the digits of the digit positions of the delay value of the delay less significant than the next less significant digit position and the digits of the less significant digit positions of the actual delay clock value less significant than the next less significant digit position.

In a fifth possible implementation of one of the first to fourth implementations of the method for timing a plurality of delays according to the second aspect of the present invention an expiration of a delay is indicated when the pointer which refers to the least significant bit position of the delay clock reaches the memory block to which the respective delay is associated.

In a sixth possible implementation of one of the first to fifth implementations of the method for timing a plurality of delays according to the second aspect of the present invention the method comprises the steps of providing one additional memory block in each clock memory, wherein the additional memory block is positioned after the memory block which refers to the highest digit of the number system; resetting each pointer to point to the memory block which refers to the lowest digit of the number system when the pointer is incremented while pointing at the additional memory block and incrementing at the same time the pointer which refers to the next more significant digit position to point to the next memory block; and compensating for system clock intervals being shorter than the basic time interval of the delay clock using the additional memory block when coupling a delay to a memory block.

In a seventh implementation of one of the first to sixth implementations of the method for timing a plurality of delays according to the second aspect of the present invention the method comprises the steps of organizing the delays which are associated to one memory block in a linked list; providing a pointer to the first element of the linked list and/or a pointer to the last element of the linked list; and providing in each delay a delay time value and/or a delay time remainder and a delay pointer to the next delay in the linked list.

The above mentioned goal of the present invention is also achieved according to a third aspect of the present invention by an apparatus for delaying a plurality of data packets, comprising at least one delay timer device according to one of the first to eighth implementations according to the first aspect of the present invention, at least one data interface configured to receive and transmit data packets and at least one processing unit configured to delay received data packets using the delay timer device. An apparatus according to the present invention can enable processing digital data using a delay timer according to the present invention. Consequently, an apparatus according to the present invention can enable effectively delaying digital data and, e.g., providing effective traffic shaping in data networks.

In a possible first implementation of the apparatus for timing a plurality of delays according to the third aspect of the present invention the apparatus comprises a network bridge.

In a possible first implementation of the apparatus for timing a plurality of delays according to the third aspect of the present invention the apparatus comprises a network switch.

In a possible first implementation of the apparatus for timing a plurality of delays according to the third aspect of the present invention the apparatus comprises a network router.

The above techniques may be implemented in hardware, software, firmware or any combinations thereof. Implemented in software the techniques may be realized in part by a computer readable medium comprising a program code containing instructions which, when executed, perform one or more of the methods described herein.

BRIEF DESCRIPTION OF THE DRAWINGS

Implementations for the delay timer device for timing a plurality of delays, for the method for timing a plurality of delays and for the apparatus for delaying a plurality of data packets, in accordance with the present invention are described with reference to the enclosed drawings.

DETAILED DESCRIPTION OF ILLUSTRATIVE EMBODIMENTS

Figure 1:
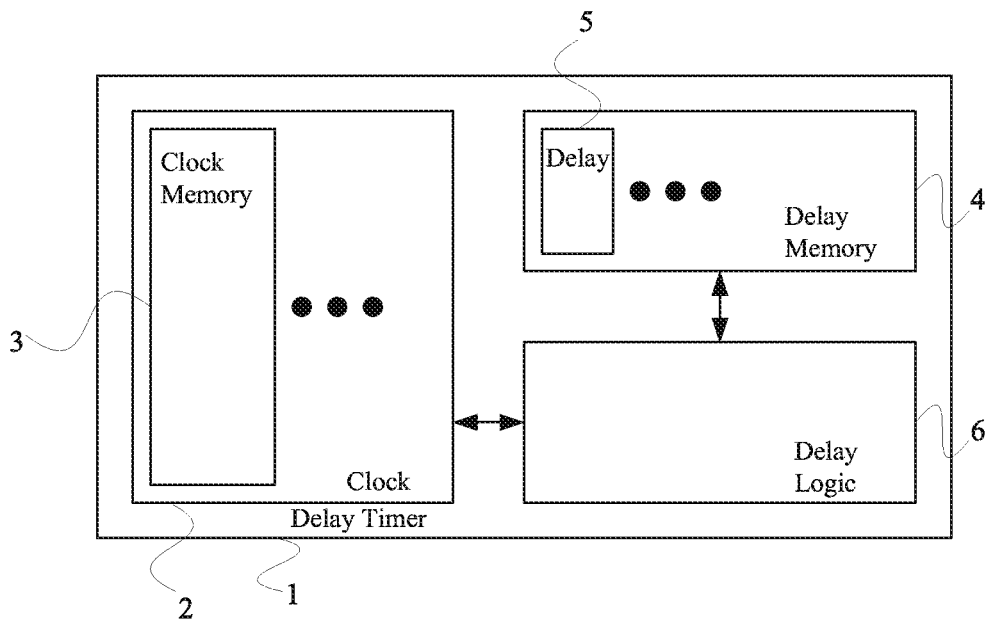
FIG. 1 shows a block diagram of a possible first implementation of a delay timer device, according to the first aspect of the present invention.

FIG. 1 shows a block diagram of a possible first implementation of a delay timer device 1, according to the first aspect of the present invention.

The delay timer device 1, illustrated in FIG. 1 comprises a delay clock 2. The delay clock 2 comprises a clock memory 3. FIG. 1 expressly illustrates a block 3 indicative of clock memory 3 and illustrates via a plurality of dots the other possible clock memories 3a, 3b and 3c. The delay clock 2 comprises one clock memory 3, 3a, 3b, 3c and 3d for every digit of the delay clock value. The delay clock value, as referred to in this description, does not depict an actual delay clock value but the maximum value the delay clock is adapted to count. If for example the delay clock value comprises four digits, which allows the delay clock to count from a delay clock value of 0000 to a delay clock value of 9999, the delay clock comprises a first clock memory corresponding to the thousands, a second clock memory corresponding to the hundreds, a third clock memory corresponding to the tens, and a fourth clock memory corresponding to the ones of the delay clock value. In contrast, the actual delay clock value is the momentary delay clock value of a delay clock at a specific point in time.

The delay timer device 1 further comprises a delay memory 4, comprising stored delays 5-5e and 5-i. Further possible delays 5-5e and 5-i are illustrated in FIG. 1 via three dots. The delay clock 2 and the delay memory 4 are both coupled to a delay logic unit 6 which is configured to store new delays 5-5e and 5-i in the delay memory 4 and to couple the new delays 5-5e and 5-i to a corresponding clock memory 3, 3a, 3b, 3c and 3d.

In a first possible embodiment of the first implementation of the delay timer device 1 as shown in FIG. 1 the delay timer device 1 is implemented as a computer program product configured to provide the functionality of the delay timer device 1 according to the first implementation of the delay timer device 1 as shown in FIG. 1. In such an embodiment the clock memories 3, 3a, 3b, 3c and 3d and the delay memory 4 are for example comprised in the main memory or RAM memory of such an apparatus as for example a personal computer running an operating system such as Windows or Linux. The functionality of the delay logic unit is embodied in computer executable instructions which are executed in the personal computer.

In a second possible embodiment of the first implementation of the delay timer device 1 as shown in FIG. 1 the delay timer device is implemented as an application specific integrated circuit configured to provide the functionality of the delay timer device according to the first implementation of the delay timer device 1 as shown in FIG. 1. In such an embodiment the clock memories 3, 3a, 3b, 3c and 3d and the delay memory 4 are for example comprised in DRAM memory devices which are directly coupled to the delay clock logic 6 which is directly comprised in integrated logic circuitry embedded in the application specific integrated circuit.

In a third possible embodiment of the first implementation of the delay timer device 1 as shown in FIG. 1 the delay logic unit 6 is configured to analyse a new delay, for instance one of 5-5e and 5-i, as to which digit of the delay value of the new delay is the most significant digit not zero wherein the delay logic unit 6 starts counting from the least significant digit of the delay value which has the ordinal number zero.

For example if the delay timer device uses 4 decimal digits to count the delay time and the delay value of a new delay is 985 the most significant digit not zero of the delay value would be the second digit equaling the decimal digit '9'. After identifying the position of the most significant digit being not zero of the delay value the delay logic unit 6 would associate the new delay with the second clock memory associated with the second digit of the delay clock value.

Figure 2:
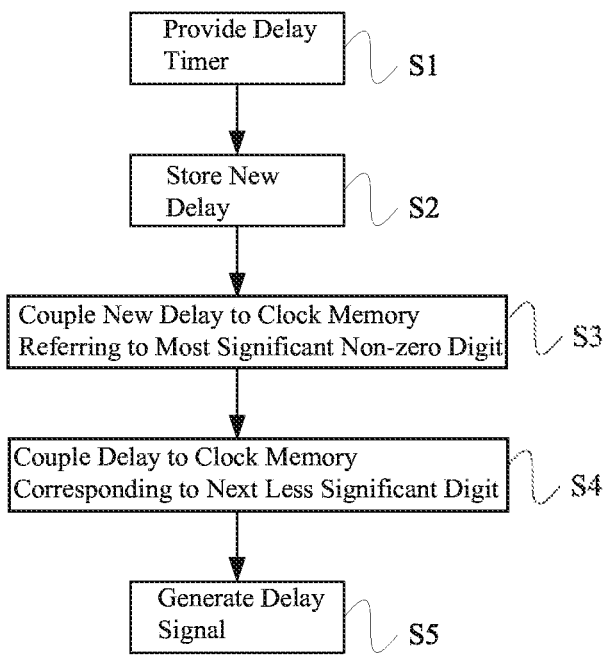
FIG. 2 shows a flow chart of a possible implementation of a method for timing a plurality of delays, according to the second aspect of the present invention.

FIG. 2 shows a flow chart of a possible implementation of a method for timing a plurality of delays, according to the second aspect of the present invention.

In a first step S1, a delay timer device 1 is provided. The delay timer device 1 is implemented according to any one of the first to eighth implementations according to the first aspect of the present invention.

In a second step S2, a new delay 5 is stored in a delay memory 4.

In a third step S3 the new delay is coupled to a clock memory that refers to the most significant digit position of the delay value of the new delay that is not zero.

Furthermore, in a fourth step S4 the delay is subsequently coupled to the clock memory that corresponds to next less significant digit position of the delay value according to the delay value of the new delay.

Finally, in a fifth step S5 a delay signal is generated when the new delay expires.

Figure 3:
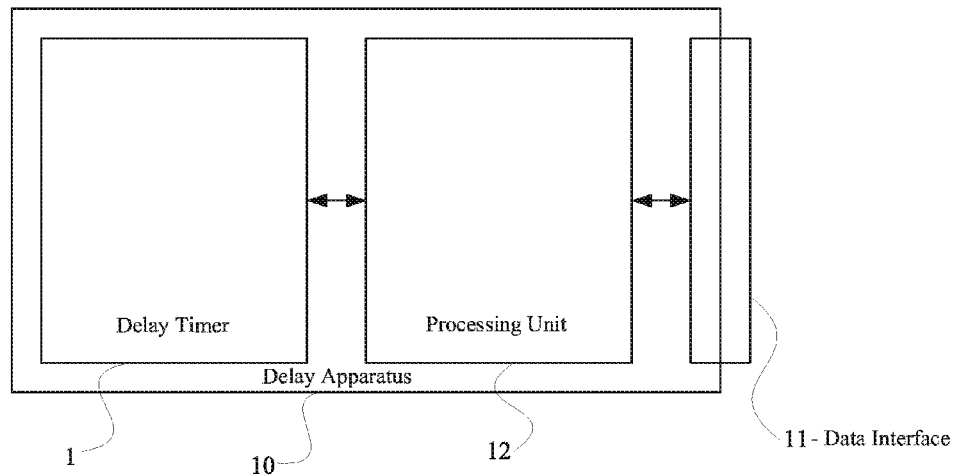
FIG. 3 shows a block diagram of a possible implementation of an apparatus for delaying a plurality of data packets, according to the third aspect of the present invention.

FIG. 3 shows a block diagram of a possible implementation of an apparatus 10 for delaying a plurality of data packets, according to the third aspect of the present invention.

The apparatus 10 of FIG. 3 comprises a delay timer device 1 according to any one of the first to eighth implementations according to the first aspect of the present invention. The apparatus 10 further comprises a data interface 11. Both, the delay timer device 1 and the data interface 11 are coupled to a processing unit 12 which is configured to delay data packets received over the data interface 11 by using the delay timer device 1.

In a possible first embodiment of the apparatus 10 according to the third aspect of the present invention as shown in FIG. 3 the apparatus 10 is included in an embedded computer. In such an embodiment the delay timer device 1 is comprised in a computer program product being executed by the operating system of the embedded computer.

In a possible second embodiment the apparatus 10 according to the third aspect of the present invention as shown in FIG. 3 the apparatus comprises a network bridge, and the data interface 11 comprises an Ethernet interface.

In a possible third embodiment the apparatus 10 according to the third aspect of the present invention as shown in FIG. 3 the apparatus comprises a network switch.

In a possible fourth embodiment the apparatus 10 according to the third aspect of the present invention as shown in FIG. 3 comprises a network router.

In a possible fifth embodiment the apparatus 10 according to the third aspect of the present invention as shown in FIG. 3 the data interface 11 comprises a token-ring interface 11, a FDDI interface 11, a wireless interface 11 or a combination thereof.

In a possible sixth embodiment of the apparatus 10 according to the third aspect of the present invention as shown in FIG. 3 the apparatus 10 is for example embedded in a network server as a computer program product.

Figure 4:
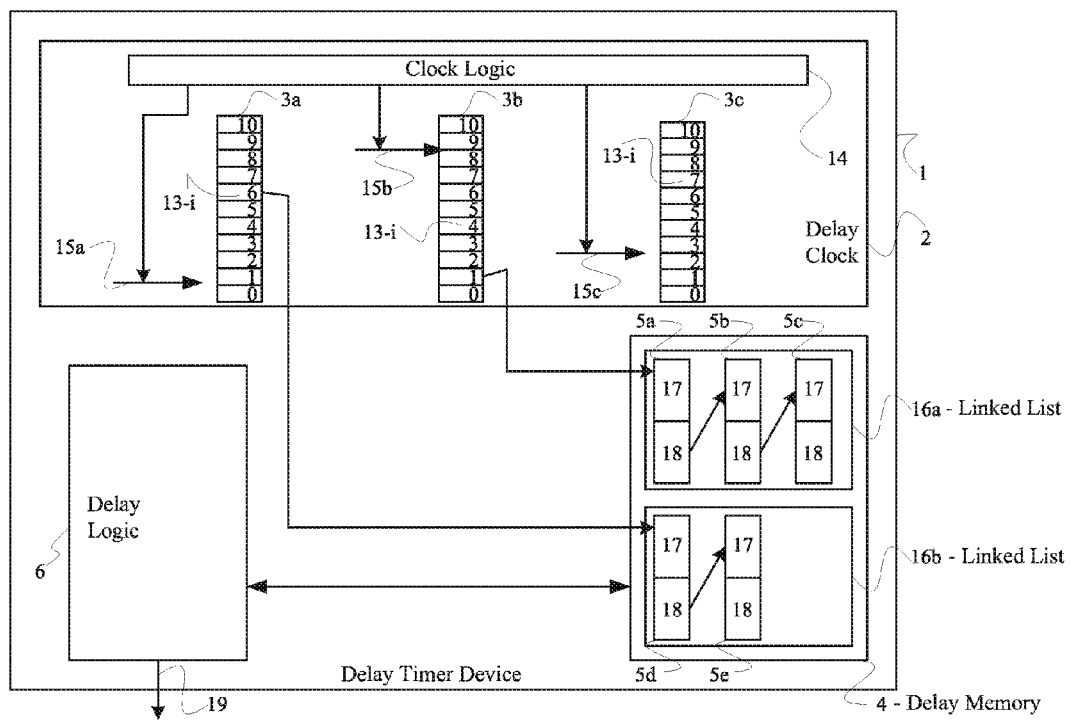
FIG. 4 shows a block diagram of a possible second implementation of a delay timer device, according to the eighth implementation of the delay timer device according to the first aspect of the invention.

FIG. 4 shows a block diagram of a possible second implementation of a delay timer device 1 according to the eighth implementation of the delay timer device according to the first aspect of the invention.

The delay timer device 1 in FIG. 4 differs from the delay timer device 1 in FIG. 1 in that the delay clock 2 comprises three clock memories 3a, 3b and 3c each having eleven memory blocks 13-i, each of the first ten memory blocks 13-i corresponding to one of the decimal digits 0-9, and the eleventh memory block 13-i is an additional memory block. The first clock memory 3a corresponds to the hundreds of a decimal value. The second clock memory 3b corresponds to the tens of a decimal value. Finally, the third clock memory 3c corresponds to the ones of a decimal value.

The delay clock 2 further comprises a clock logic unit 14 and three pointers 15a, 15b and 15c. The first pointer 15a points the first memory block 13-i, which corresponds to the decimal number 0, of the first clock memory 3a corresponding to the hundreds of the actual delay clock value. The second pointer 15b points to the tenth memory block 13-i, which corresponds to the decimal number 9, of the second clock memory 3b corresponding to the tens of the actual delay clock value. Finally, the third pointer 15c points to the third memory block 13-i, which corresponds to the decimal number 2, of the third clock memory 3c corresponding to the ones of the actual delay clock value. In this constellation the pointers 15a-15c depict an actual delay clock value of 92.

In such an embodiment an actual delay clock value of for example 386 would be represented by the first pointer 15a pointing to the fourth memory block 13-i, which corresponds to the decimal number 3, of the first clock memory 3a, the second pointer 15b pointing to the ninth memory block 13-i, which corresponds to the decimal number 8, of the second clock memory 3b, and the third pointer 15c pointing to the seventh memory block 13-i, which corresponds to the decimal number 6, of the third clock memory 3c.

The delay timer device 1 represented in FIG. 4 further differs from the delay timer device 1 represented in FIG. 1 in that the delay memory 4 comprises linked lists. According to one embodiment of the present invention one linked list is associated with every memory block 13-i that comprises delays 5-5e and 5-i, which have to be attended to, when the pointer corresponding to the clock memory 3, 3a, 3b and 3c which comprises the memory block 13-i, is incremented to point to the memory block 13-i. Consequently, linked lists 16a, 16b are not associated with every memory block. In another embodiment one separate linked list, for example one of the linked lists 16a, 16b, is associated with every memory block 13-i, even if the linked list is empty.

Accordingly, the delay memory 4 in FIG. 4 comprises two linked lists 16a and 16b for storing a plurality of delays, wherein the first linked list 16a comprises three delays 5a, 5b and 5c and the second linked list 16b comprises two delays 5d and 5e.

A linked list is a construction for efficiently organizing items in electronic memories. A linked list comprises at least one first element. This first element comprises a value or payload and a pointer to another element. As long as no second element is added to the linked list, the pointer of the first element points nowhere (NULL-pointer). If a second element is added to the linked list, the pointer of the first element is updated to point at the second element and the pointer of the second element points nowhere. This allows efficient iteration over all elements of a linked list by following the respective pointer of each element of a linked list until reaching a NULL-pointer.

In FIG. 4 each of the delays 5a-5e comprises a delay time remainder 17, aka the payload, and a delay pointer 18 to the next delay 5a-5e in the linked list 16a, 16b. The delay pointer 18 of the last delay in a linked list 16a, 16b is a NULL-pointer pointing nowhere.

Furthermore, the first linked list 16a is associated with the second memory block 13-i, which corresponds to the decimal number 1, of the second clock memory 3b and the second linked list 16b is associated with the seventh memory block 13-i, which corresponds to the decimal number 6, of the first clock memory 3a. Consequently, the delay timer 1 in FIG. 4 has five delays that need to be timed. Of these five delays two delays 5d and 5e will be attended to, when the pointer 15a is incremented to point at the seventh memory block 13-i, which corresponds to the decimal number 6, of the first clock memory 3a. The remaining three delays 5a, 5b and 5c will be attended to, when the pointer 15b is incremented to point at the second memory block 13-i, which corresponds to the decimal number 1, of the second clock memory 3b.

In another exemplary embodiment the delay memory 4 comprises a number of delays higher or lower than five and the delay memory 4 comprises more or less than two linked lists 16a, 16b. In one exemplary embodiment the clock memory 4 comprises one linked list for every memory block 13-i, even if no delay 5, 5a, 5b, 5c is associated with a memory block 13-i.

Finally, the delay logic unit 6 in FIG. 4 is configured to indicate the expiration of a delay via delay signal 19.

In the possible second implementation of a delay timer device 1 according to the eighth implementation of the delay timer device 1 according to the first aspect of the invention, the delay timer device 1 uses three decimal digits to count the actual delay clock value and manage the delays 5-5e and 5-i. Furthermore, the basic time interval of the delay clock is 1 ms wherein the system clock at which the personal computer comprising the delay timer device operates is 1 GHz.

The delay logic unit 6 is configured to add new delays by associating a delay with the appropriate memory block 13-i of the appropriate clock memory 3-3c.

If for example the delay clock 2 is restarted it starts counting at '000'. If for example a delay 5 of 539 ms is to be added in the delay timer device 1 the delay logic unit 6 would associate that delay with the sixth memory block 13-i, which corresponds to the decimal number 5, of the first clock memory 3a, which corresponds to the hundreds of the delay clock value. The delay logic unit furthermore calculates the remainder of the delay value of the delay, which is to be added to the delay timer 1. This is done by subtracting from the delay value 539 the hundreds value, the delay is associated with, 500. In this example 539–500. Finally, the delay logic unit stores in the delay memory 4 the delay, for instance one of 5-5e and 5-i, comprising the remainder 17 of 39 ms. If for instance a basic time interval is 1 millisecond the clock logic unit 14 would increment the third pointer 15c every millisecond, the second pointer 15b every 10 milliseconds and the first pointer 15a every 100 milliseconds.

When the first pointer 15a is incremented to point to the sixth memory block 13-i, which corresponds to the decimal number 5, of the first clock memory 3a the delay logic unit 6 associates the delay with the fourth memory block 13-i, which corresponds to the decimal number 3, of the second clock memory 3b and stores the new delay remainder 17 of nine in the delay.

Consequently, when the second pointer 15b is incremented to point to the fourth memory block 13-i, which corresponds to the decimal number 3, of the second clock memory 3b, the delay logic unit 6 associates the delay with the tenth memory block 13-i, which corresponds to the decimal number 9, of the third clock memory 3c, and stores a remainder 17 of zero in the delay.

Finally, when the third pointer 15c is incremented to point to the tenth memory block 13-i, which corresponds to the decimal number 9, of the third memory 3c the delay logic unit 6 outputs a delay signal 19, indicating that the delay time has elapsed. The computations needed to time this delay consisted only of three computations, each taking place, when the corresponding pointer reached the memory block 13-i associated with the delay. In this example the delay clock was reset before inputting a new delay, for instance one of 5-5e and 5-i. In the next example, presenting in decimalism, a delay, for instance one of 5-5e and 5-i, will be added with a delay value of 995 ms and with the actual delay clock value being '092', as indicated by the pointers 15a-15c in FIG. 4. This example will also clarify why the additional eleventh memory block 13-i is needed.

Take the decimalism as an example, as shown in FIG. 4, each clock memory 3a, 3b and 3c comprises ten memory blocks 13-i and one additional memory block 13-i, i.e. eleven memory blocks 13-i in total.

When the delay with the delay value of '995' ms is added to the delay memory 4 the delay is associated with the first clock memory 3a which represents the hundreds of the delay clock value. To calculate with which memory block 13-i the new delay has to be associated, the delay logic unit 6 calculates the sum of the tens and ones of the delay value and the actual delay clock value and adds the hundreds-carry over to the hundreds value of the delay value of the new delay. In this example the tens and ones of the delay equal '95', and the tens and ones of the actual delay clock value equal '92'. The sum equals 187. Thus, one carry over is added to the 9-hundreds of the delay value. Consequently, the hundreds of delay value is ten, the new delay is associated with the additional eleventh memory block 13-i, which corresponds to the decimal number 10, of the first clock memory 3a. The additional eleventh memory block 13-i is needed because the first pointer 15a is actually pointing at the first memory block 13-i, which corresponds to the decimal number 0, of the first clock memory 3a. Furthermore, the remainder '87' is stored in the delay memory 4. When the first pointer 15a is after 1000 ms incremented to point to the additional eleventh memory block 13-i, which corresponds to the decimal number 10, of the first clock memory 3a, the delay is associated with the ninth memory block 13-i, which corresponds to the decimal number 8, of the second memory 3b. When the second pointer 15b is after another 80 ms incremented to point at the ninth memory block 13-i, which corresponds to the decimal number 8, of the second delay memory 3b, the delay is associated with the eighth memory block 13-i, which corresponds to the decimal number 7, of the third delay memory 3c. Finally, after another 7 ms, the third pointer 15c is incremented to point at the eighth memory block 13-i, which corresponds to the decimal number 7, of the third delay memory 3c, the delay is removed from the delay memory 4 and the delay logic unit indicates using delay signal 19 that the delay has expired.

In a possible third implementation of a delay timer device 1 according to the eighth implementation of the delay timer device according to the first aspect of the present invention, the basic time interval used by the delay timer device is $1/10^{th}$ of a millisecond.

In a possible fourth implementation of a delay timer device 1 according to the eighth implementation of the delay timer device according to the first aspect of the present invention, the basic time interval used by the delay timer device is 10 milliseconds.

Further implementations of the delay timer device 1 as shown in FIGS. 1 and 4 are possible. For example, in a further possible implementation the delay timer device uses a binary, octal hexadecimal or other number system.

Figure 5:
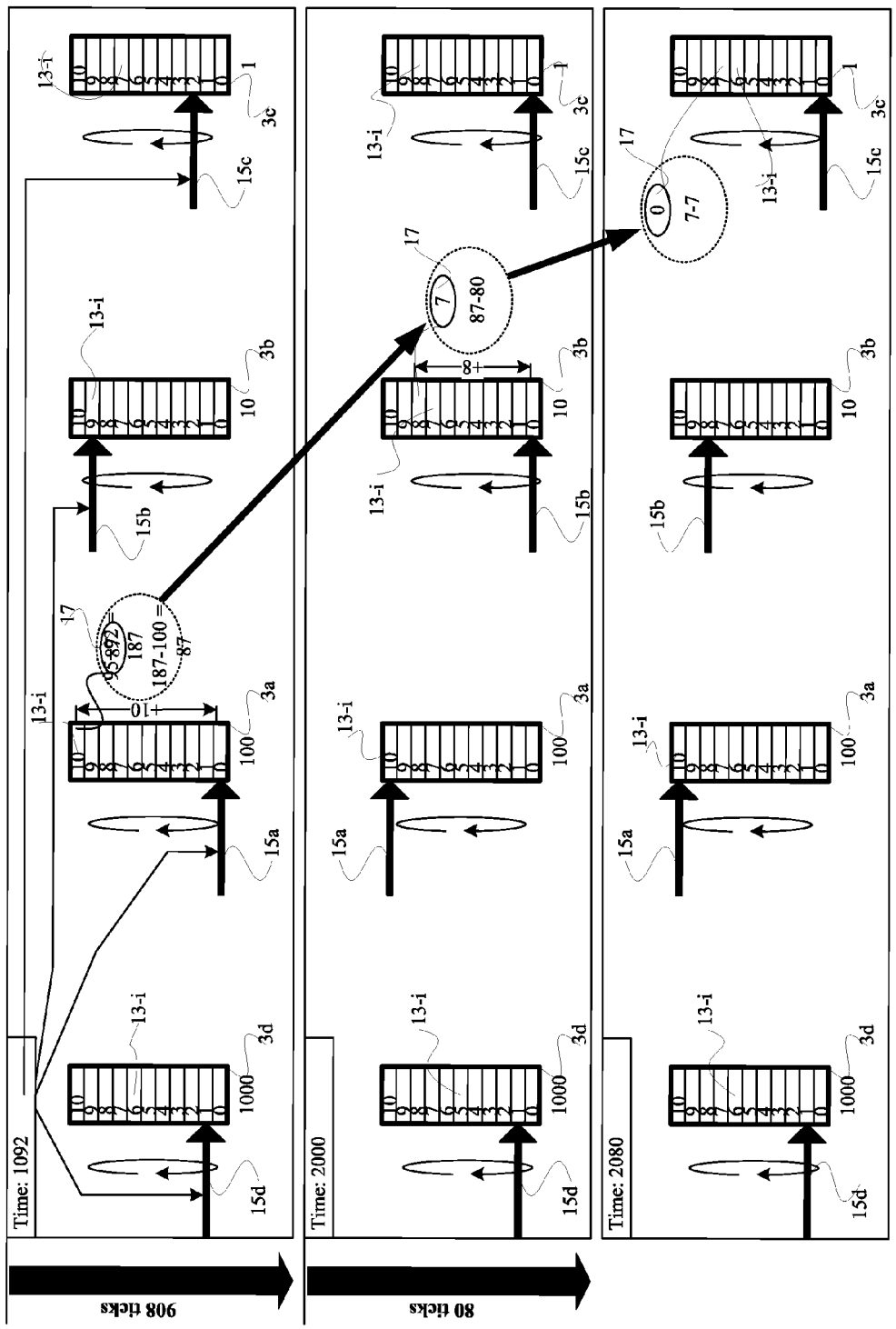
FIG. 5 shows a block diagram showing the state of four clock memories at three consecutive points in time.

FIG. 5 shows a block diagram showing the state of four clock memories at three consecutive points in time. The first point in time is a point in time where the actual delay clock value is 1092. The second point in time is a point in time where the actual delay clock value is 2000. Finally the third point in time is a point in time where the actual delay clock value is 2080. In FIG. 5 four clock memories 3a, 3b, 3c and 3d are shown at the three points in time. Clock memory 3d corresponds to the thousands of the delay clock value. Clock memory 3a corresponds to the hundreds of the delay clock value. Clock memory 3b corresponds to the tens of the delay clock value. Finally, clock memory 3c corresponds to the ones of the delay clock value.

One pointer 15a, 15b, 15c and 15d is provided for each of the four clock memories 3a, 3b, 3c and 3d. At the first point in time the pointer 15d points at the second memory block 13-i, which corresponds to the decimal digit 1, of the clock memory 3d. The pointer 15a points at the first memory block 13-i, which corresponds to the decimal digit 0, of the clock memory 3a. The pointer 15b points at the tenth memory block 13-i, which corresponds to the decimal digit 9, of the clock memory 3b. Finally, the pointer 15c points at the third memory block 13-i, which corresponds to the decimal digit 2, of the clock memory 3c.

At the second point in time the pointer 15d points at the second memory block 13-i, which corresponds to the decimal digit 1, of the clock memory 3d. The pointer 15a points at the eleventh memory block 13-i, which corresponds to the decimal digit 10, of the clock memory 3a. The pointer 15b points at the first memory block 13-i, which corresponds to the decimal digit 0, of the clock memory 3b. Finally, the pointer 15c points at the first memory block 13-i, which corresponds to the decimal digit 0, of the clock memory 3c.

At the third point in time the pointer 15d points at the second memory block 13-i, which corresponds to the decimal digit 1, of the clock memory 3d. The pointer 15a points at the eleventh memory block 13-i, which corresponds to the decimal digit 10, of the clock memory 3a. The pointer 15b points at the ninth memory block 13-i, which corresponds to the decimal digit 8, of the clock memory 3b. Finally, the pointer 15c points at the first memory block 13-i, which corresponds to the decimal digit 0, of the clock memory 3c.

Between the first point in time and the second point in time 908 basic time intervals elapse. Between the second point in time and the third point in time 80 basic time intervals elapse.

FIG. 5 shows the processing of a delay that is added at the first point in time, the delay having a delay value of 995. A delay value of 1 corresponds to the basic time interval of the delay timer 1. At an actual delay clock value of 1092 the new delay is added to the delay timer 1. To determine the memory block 13-i which the new delay has to be coupled to, at first the most significant digit of the delay value is determined, which is not zero. With a delay value of 995 the third digit is determined. Furthermore the sum of the remaining digits, tens and ones, of the delay value and the actual delay clock value is calculated, in this case 95+92. The sum equals 187. Because the sum is greater than 99 the carryover of 100 has to be added to the value of the first the most significant digit of the delay value, which is not zero, in this case 900+100=1000. Consequently, the new delay has to be added ten, 1000/100=10, memory blocks 13-i ahead of the memory block 13-i the pointer 15a is pointing at the first point in time. Therefore, the new delay is coupled to the eleventh memory block 13-i of the clock memory 3a, which corresponds to the hundreds of the delay clock value. When the delay is coupled to the eleventh memory block 13-i a first remainder 17 having a value of 87 is stored and coupled to the eleventh memory block 13-i.

At the second point in time the pointer 15a is incremented to point at the eleventh memory block 13-i, which corresponds to the decimal digit 10, of the clock memory 3a. At this moment the first remainder 17 having a value of 87 is processed again. A second remainder 17 is calculated by subtracting the tens and ones of the actual delay clock value, in this case 80, from the first remainder 17, 87−80=7. Consequently, because the tens digit of the first remainder equals 8 the second remainder 17 having a value of 7 is coupled to the clock memory 13-*i* that corresponds to the position which the pointer 15*b* is pointing at the second point in time plus eight, in this case the ninth memory block 13-*i*, which corresponds to a decimal digit of 8.

At the third point in time the pointer 15*b* is incremented to point at the ninth memory block 13-*i*, which corresponds to a decimal digit of 8. At this moment the second remainder 17 having a value of 7 is processed again. Because the ones are the least significant digit of the delay clock value and the delay value no third remainder is calculated. Consequently, because the ones digit of the second remainder equals 7 the delay is coupled to the clock memory 13-*i* that corresponds to the position which the pointer 15*c* is pointing at the third point in time plus seven, in this case the eighth memory block 13-*i*, which corresponds to a decimal digit of 7, and a remainder of 0 is stored.

In a fourth point in time, which is not shown in FIG. 5, after another seven basic time intervals the pointer 15*c* points at the eighth memory block 13-*i*, which corresponds to a decimal digit of 7. The delay is removed from the memory block and a delay signal 19 is generated for that delay.

Figure 6:
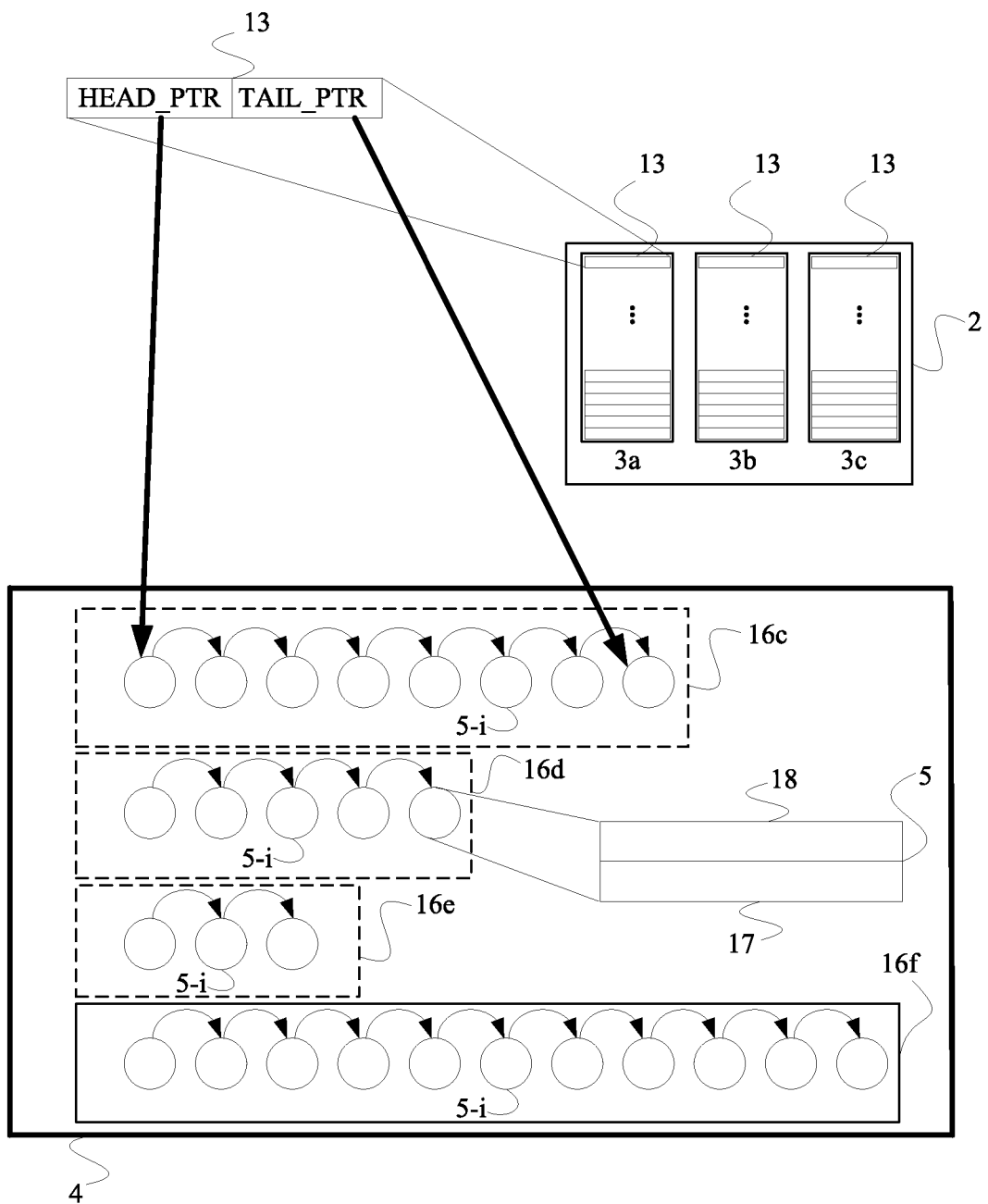
FIG. 6 shows a block diagram with clock memories and linked lists.

FIG. 6 shows a block diagram with clock memories and linked lists. In FIG. 6 a delay clock 2 is shown with three clock memories 3*a*, 3*b* and 3*c*. Each clock memory 3*a*, 3*b* and 3*c* comprises a plurality of memory blocks 13-*i*. The upper memory block 13-*i* of the clock memory 3*a* is shown in detail as enlarged memory block 13-*i*. The enlarged memory block 13-*i* comprises a head pointer HEAD_PTR and a tail pointer TAIL_PTR. The head pointer HEAD_PTR points to the first delay 5-*i* of a first linked list 16*c*. The tail pointer TAIL_PTR points to the last delay 5-*i* of the first linked list 16*c*. The linked list 16*c* comprises 8 delays organized in a row, wherein the first delay 5-*i* points (indicated by an arrow) to the second delay. Furthermore, every consecutive delay 5-*i* points to the next delay 5-*i* in the row until the last delay 5-*i* is reached.

FIG. 6 shows three further linked lists 16*d*, 16*e* and 16*f*. In the second linked list 16*d* five delays 5 are organized with the same scheme as in the first linked list 16*c*. In the third linked list 16*e* three delays 5 are organized with the same scheme as in the first linked list 16*c*. Finally, in the fourth linked list 16*f* eleven delays 5 are organized with the same scheme as in the first linked list 16*c*.

The last delay 5-*i* of the second linked list is shown in detail as an enlarged delay 5-*i*. The enlarged delay 5-*i* comprises two blocks. The first block shows a remainder 17. The second block shows a pointer 18 to the next delay in the linked list.

What is claimed is:

1. A delay timer device for timing a plurality of delays, comprising:
    a delay clock circuit comprising a number of clock memories, wherein the number of clock memories corresponds to a number of digit positions of a delay clock value;
    a delay memory circuit configured to store the plurality of delays; and
    a delay logic circuit configured to add a new delay by storing it in the delay memory and to time the new delay by coupling it to a clock memory of the number of clock memories which corresponds to a most significant digit position of a delay value of the new delay that is not zero, by subsequently coupling the new delay to a clock memory of the number of clock memories which corresponds to a next less significant digit position of the delay value of the new delay and by generating a delay signal when the new delay expires.

2. The delay timer device of claim 1,
    wherein each clock memory comprises at least one memory block for every digit in a number system used by the delay timer device, and
    wherein the delay clock comprises one pointer for every clock memory,
    wherein the pointer points to the memory block indicating an actual delay clock value at the digit position which refers to the corresponding clock memory.

3. The delay timer device of claim 2,
    wherein a basic time interval for the delay timer indicates a time step corresponding to a one digit increment of a least significant digit position of the delay clock,
    wherein the delay clock circuit comprises a clock logic circuit,
    wherein the clock logic circuit is configured to increment the pointer which refers to the least significant digit position of the delay clock circuit after every basic time interval; and
    wherein the clock logic circuit is further configured to reset each pointer to point to the memory block which refers to a lowest digit of the number system when the pointer is incremented while pointing at the memory block which refers to a highest digit of the number system and wherein the clock logic circuit is further configured to increment at a same time the pointer which refers to a next more significant digit position to point to the next memory block.

4. The delay timer device of claim 3,
    wherein each clock memory comprises one additional memory block, wherein the additional memory block is positioned after the memory block which refers to the highest digit of the number system;
    wherein the clock logic circuit is further configured to reset each pointer to point to the memory block which refers to the lowest digit of the number system when the pointer is incremented while pointing at the additional memory block and wherein the clock logic circuit is further configured to increment at the same time the pointer which refers to the next more significant digit position to point to the next memory block; and
    wherein the delay logic circuit is configured to compensate for system clock intervals being shorter than the basic time interval of the delay clock using the additional memory block when coupling a delay to a memory block.

5. The delay timer device of claim 2,
    wherein the delay logic circuit is further configured to add the new delay by coupling the stored new delay to the clock memory that refers to the most significant digit position of the delay value of the stored new delay, that is not zero; and
    wherein the stored new delay is associated to the memory block of the clock memory that is the memory block at the position at which the respective pointer points at the time of adding the new stored delay incremented by a number of steps indicated by the most significant digit position of the delay value of the stored new delay, that is not zero, plus a carryover of a sum of the digits of less significant digit positions of the delay value of the stored new delay and the digits of less significant digit positions of the actual delay clock value.

6. The delay timer device of claim 2,
    wherein the delay logic circuit is configured to couple the new delay to the clock memory which refers to the next less significant position of the delay value when the pointer which refers to the clock memory to which the delay is momentarily associated to reaches the memory block of the clock memory to which the delay is associated to; and wherein the delay logic circuit is further configured to couple the delay to a memory block of the clock memory which refers to the next less significant position of the delay value, the memory block which refers to the memory block at which the respective pointer points at the time of coupling the delay incremented by a number of steps indicated by the next less significant digit position of the delay value of the delay, plus a carryover of a sum of the digits of the digit positions of the delay value of the delay less significant than the next less significant digit position and the digits of less significant digit positions of the actual delay clock value less significant than the next less significant digit position.

7. The delay timer device of claim 2,
wherein the delay logic circuit is configured to indicate the expiration of a delay when the pointer which refers to the least significant digit position of the delay clock reaches the memory block to which the respective delay is associated.

8. The delay timer device of claim 2,
wherein the delays which are associated to one memory block are organized in a linked list;
wherein the memory block comprises a pointer to at least one of a first element of the linked list and a pointer to a last element of the linked list; and
wherein a delay comprises at least one of a delay value and a delay time remainder and a delay pointer to the next delay in the linked list.

9. The delay timer device of claim 1,
wherein the delay timer device comprises at least one of a programmable logic device a processor, and an application specific integrated circuit.

10. A method for timing a plurality of delays, comprising:
storing a new delay in a delay memory;
coupling the new delay to a clock memory of a delay clock comprising a number of clock memories, wherein the clock memory corresponds to a most significant digit position of a delay value of the new delay that is not zero, and wherein the number of clock memories corresponds to a number of digit positions of a delay clock value;
subsequently coupling the new delay to one of the clock memories that corresponds to a next less significant digit position of the delay value of the new delay; and
generating a delay signal when the new delay expires.

11. The method of claim 10, comprising the steps of:
providing at least one memory block for every digit in a number system used by a delay timer device in each clock memory;
providing one pointer for every clock memory; and
pointing the pointer to the memory block indicating an actual delay clock value at the digit position which refers to the respective clock memory.

12. The method of claim 11,
wherein a basic time interval for a delay timer indicates a time step corresponding to a one digit increment of a least significant digit position of the delay clock,
the method comprising the steps of:
incrementing the pointer which refers to the least significant digit position of the delay clock after every basic time interval; and
resetting each pointer to point to the memory block which refers to a lowest digit of the number system when the pointer is incremented while pointing at the memory block which refers to a highest digit of the number system and further incrementing at a same time the pointer which refers to a next more significant digit position to point to the next memory block.

13. The method of claim 11, wherein the new delay is added by
coupling the stored new delay to the clock memory that refers to the most significant digit position of the delay value of the stored new delay, that is not zero; and
coupling the stored new delay to the memory block of the clock memory that is the memory block at the position at which the respective pointer points at the time of adding the new stored delay incremented by a number of steps indicated by the most significant digit position of the delay value of the stored new delay, that is not zero, plus a carryover of a sum of the digits of less significant digit positions of the delay value of the stored new delay and the digits of less significant digit positions of the actual delay clock value.

14. The method of claim 11,
wherein a delay is associated to the clock memory which refers to the next less significant position of the delay value when the pointer which refers to the clock memory to which the delay is momentarily associated to reaches the memory block of the clock memory to which the delay is associated to; and
wherein the delay is associated to a memory block of the clock memory which refers to the next less significant position of the delay value, the memory block which refers to the memory block at which the respective pointer points at the time of coupling the delay incremented by a number of steps indicated by the next less significant digit position of the delay value of the delay, plus a carryover of a sum of the digits of the digit positions of the delay value of the delay less significant than the next less significant digit position and the digits of less significant digit positions of the actual delay clock value less significant than the next less significant digit position.

15. An apparatus for delaying a plurality of data packets, comprising:
at least one delay timer device according to claim 1;
at least one data interface connected to the at least one delay timer device and configured to receive and transmit data packets; and
at least one processing circuit configured to delay received data packets using the delay timer device.

16. The apparatus of claim 15,
wherein each clock memory comprises at least one memory block for every digit in a number system used by the delay timer device, and
wherein the delay clock comprises one pointer for every clock memory,
wherein the pointer is configured to point to the memory block indicating an actual delay clock value at the digit position which refers to the corresponding clock memory.

17. A delay timer device for timing a plurality of delays, comprising:
a delay clock circuit comprising a number of clock memories, wherein the number of clock memories corresponds to a number of digit positions of a delay clock value;
a first processing circuit; and
a non-transitory computer-readable storage medium storing a program to be executed by the first processing circuit, the program including instructions to:
store the plurality of delays in a delay memory; and add a new delay by storing it in the delay memory and to time the new delay by coupling it to a clock memory of the number of clock memories which corresponds to a most significant digit position of a delay value of the new delay that is not zero, by subsequently coupling the new delay to a clock memory of the number of clock memories which corresponds to a next less significant digit position of the delay value of the new delay and by generating a delay signal when the new delay expires.

* * * * *